(12) United States Patent  
Kore et al.

(10) Patent No.: US 9,123,219 B2
(45) Date of Patent: Sep. 1, 2015

(54) WIRELESS FIRE SYSTEM BASED ON OPEN STANDARD WIRELESS PROTOCOLS

(75) Inventors: Vinayak Sadashiv Kore, Karnataka (IN); Steve Huseth, Plymouth, MN (US); Patrick Gonia, Maplewood, MN (US); Andrew G. Berezowski, Wallingford, CT (US)

(73) Assignee: Honeywell International Inc., Morristown, NJ (US)

( * ) Notice: Subject to any disclaimer, the term of this patent is extended or adjusted under 35 U.S.C. 154(b) by 71 days.

(21) Appl. No.: 13/526,962

(22) Filed: Jun. 19, 2012

(65) Prior Publication Data

US 2013/0336292 A1    Dec. 19, 2013

(51) Int. Cl.
*H04L 27/26* (2006.01)
*H04L 5/00* (2006.01)
*G08B 17/10* (2006.01)
*G08B 25/00* (2006.01)
*H04W 40/00* (2009.01)
*H04W 40/24* (2009.01)
*H04W 52/46* (2009.01)
*H04W 84/18* (2009.01)

(52) U.S. Cl.
CPC .............. *G08B 17/10* (2013.01); *G08B 25/009* (2013.01); *H04W 40/005* (2013.01); *H04W 40/246* (2013.01); *H04W 84/18* (2013.01)

(58) Field of Classification Search
USPC .................................. 370/336, 328, 528, 389
See application file for complete search history.

(56) References Cited

U.S. PATENT DOCUMENTS

| 8,457,124 | B2 * | 6/2013 | Mosko ........................... 370/389 |
| 8,611,275 | B2 * | 12/2013 | Yarvis et al. ................. 370/328 |
| 2007/0041345 | A1 * | 2/2007 | Yarvis et al. ................. 370/331 |
| 2008/0043637 | A1 | 2/2008 | Rahman |
| 2010/0177684 | A1 * | 7/2010 | Kore et al. .................... 370/328 |
| 2010/0215040 | A1 * | 8/2010 | Kappler et al. ............... 370/390 |
| 2011/0149770 | A1 * | 6/2011 | Cimini et al. ................. 370/252 |
| 2011/0289578 | A1 * | 11/2011 | Bugenhagen et al. .......... 726/11 |
| 2011/0299612 | A1 * | 12/2011 | Tan et al. ....................... 375/260 |
| 2012/0020281 | A1 * | 1/2012 | Nakamura .................... 370/328 |

OTHER PUBLICATIONS

Leffler, Sam , "TDMA for Long Distance Wireless Networks", Sep. 21, 2009. University of Cambridge.*
W. Steven Conner, Jan Kruys, Kyeongsoo (Joseph) Kim, Juan Carlos Zuniga: "IEEE802.11s Tutorial Overview of the Amendment for Wireless Local Area Mesh Networking", (Nov. 1, 2006.
Jerome Henry: "802.11s Mesh Networking", cwnp whitepaper (Nov. 2011).

* cited by examiner

*Primary Examiner* — Charles C Jiang
*Assistant Examiner* — Will Lin
(74) *Attorney, Agent, or Firm* — Wood, Phillips, Katz, Clark & Mortimer

(57) ABSTRACT

A wireless fire detection monitoring system comprises a control unit which includes a wireless transceiver and control software to implement a wireless multi-hop communications protocol. A network of battery powered monitoring devices is provided for monitoring alarm conditions. Each monitoring device includes software to implement the wireless communication protocol with one of, the control unit and at least one other child member of the plurality, or, at least two other members of the plurality where a selected device communicates with at least one child device and at least one parent device. The wireless multi-hop communications protocol comprises a time division multiple access communications protocol with the monitoring devices being time synchronized and the control unit and the monitoring devices are adapted to communicate compliant with the IEEE 802.11 standard.

21 Claims, 9 Drawing Sheets

WIRELESS FIRE SYSTEM BASED ON OPEN STANDARD WIRELESS PROTOCOLS

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This application relates to fire monitoring and alarm systems, and more particularly, to such a system where devices communicate wirelessly with a system control unit, such as a fire alarm panel.

BACKGROUND

Various types of monitoring and alarm systems are known. In many of these systems, modules such as fire, smoke or gas detectors are coupled via a wired medium, cables, for example, to a control unit or fire alarm panel. Such systems always reflect installation, operational and maintenance costs associated with the wired medium.

Examples of monitoring and fire detection systems are found in U.S. Pat. No. 5,483,222 to Tice entitled "Multiple Sensor Apparatus and Method" and U.S. Pat. No. 6,163,263 to Tice et al. entitled "Circuitry for Electrical Device in Multi-Device Communications System", which are assigned to the assignee hereof.

There is an ongoing need to reduce the costs of installing and maintaining such systems. There is also an ongoing need to be able to conveniently and cost effectively modify the configuration of such systems, due to remodeling for example, or expansion of a monitored region.

In response to these needs, labor costs and time involved in installation have been reduced by developing wireless fire systems based on a network of battery operated devices. These wireless fire systems are based on low data rate protocols that suffer from bandwidth limitations resulting in reduced capacity and increased detection and activation latency. These wireless fire systems cannot support additional communication needed to support voice evacuation on the same network. Using a standard wireless protocol radio can help in reducing the cost of the wireless fire devices. However, most of the standard based protocols use CSMA/CA channel access protocol which cannot offer deterministic performances in a high capacity, high data generating network. These protocols are not efficient for battery powered devices.

SUMMARY

A wireless fire detection monitoring system uses time division multiple access mesh communication protocols running over a mesh of open standard high data rate protocol based wireless devices.

Broadly, there is disclosed a wireless fire detection monitoring system comprising a control unit which includes a wireless transceiver and control software to implement a wireless multi-hop communications protocol. A network of battery powered monitoring devices is provided for monitoring alarm conditions. Each monitoring device includes software to implement the wireless communication protocol with one of, the control unit and at least one other child member of the plurality, or, at least two other members of the plurality where a selected device communicates with at least one child device and at least one parent device. The wireless multi-hop communications protocol comprises a time division multiple access communications protocol with the monitoring devices being time synchronized and the control unit and the monitoring devices are adapted to communicate compliant with the IEEE 802.11 standard.

It is a feature that the mesh communications protocol is implemented at a MAC layer level of the monitoring devices, or at a network layer level of the monitoring devices, or at an application layer level of the monitoring devices. The clocks of network devices will be synchronized with that of master devices to a desired accuracy using one of the known methods in the art. Any of these methods can be implemented using health messages or a sequence thereof. The nodes are synchronized just after discovery and later at an interval depending on worst case clock drifts.

It is another feature that the control unit comprises a master clock for time synchronizing the monitoring devices. The monitoring devices may exchange health messages to synchronize with one another and the control unit. Each monitoring device may send a health message to its previous level monitoring device in the mesh network. Each monitoring device may send a time sync message to its next level monitoring device in the mesh network.

It is yet another feature that the monitoring devices are configured to transmit requests and responses via the network on a time slot basis to the control unit and other monitoring devices of the network.

It is still another feature that the monitoring devices become active for a predetermined time interval during selected time slots to receive incoming data, and the absence thereof, return to an inactive state.

Other features and advantages will be apparent from a review of the entire specification, including the appended claims and drawings.

DETAILED DESCRIPTION

A wireless fire detection monitoring and alarm system incorporates a multi-hop time division multiple access (TDMA) communications protocol. The monitoring system disclosed herein uses a TDMA mesh communications protocol running over a mesh of open standard high data rate protocol based wireless devices. The wireless device may communicate using, for example, IEEE 802.11, or the like. The IEEE 802.11 communications described herein references communications that are compliant with the required features of "IEEE Std. 802.11-2007". The devices of the network are time synchronized to achieve deterministic performance as well as to schedule communications in order to reduce power consumption. The TDMA mesh communication of standard based radio devices can be implemented at the MAC layer level, at the network layer level, or at the application layer level of the 7-layer OSI reference model, depending on implementation and availability of access to layers of the wireless stack.

Figure 1A:
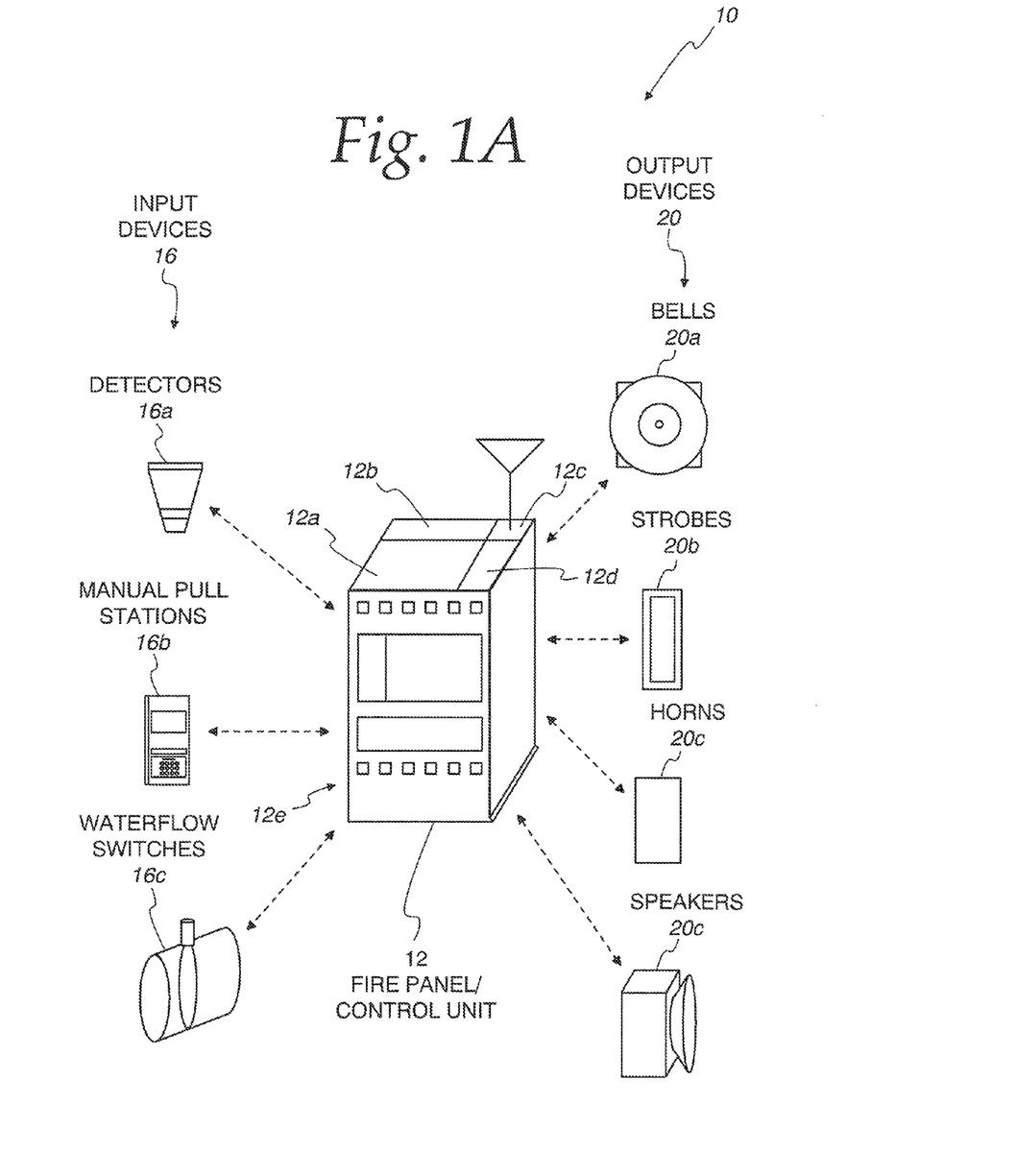
FIG. 1A is a block diagram of a wireless fire detection monitoring system.

FIG. 1A illustrates an exemplary fire detection monitoring system 10. The system 10 includes a fire alarm control panel, or control unit 12, a plurality of input devices 16 and a plurality of output devices 20. The system 10 could be installed in a region R to provide monitoring and alarm indicating functions as would be understood by those of skill in the art.

The control unit 12 could be implemented with one or more programmable processors 12a, interface circuitry 12b, a transceiver and associated antenna(s) 12c as well as control software 12d. The control software 12d could be stored on a computer readable medium and executed by the processors 12a to implement the above noted communications protocol.

Each of the members of the plurality 16 could include, without limitation, fire, smoke or gas detectors 16a, pull switches 16b or water flow switches 16c. The members of the plurality 16 are each in bidirectional wireless communication, via a predefined time slot, directly or indirectly with the control unit 12.

Each of the members of the plurality 20 could include, without limitation, audible devices such as bells, horns, or the like 20a, visual output devices such as strobes 20b and verbal-type audio output devices such as speakers 20c. The members of the plurality 20 are each in bidirectional wireless communication, via a predefined time slot, directly or indirectly with control unit 12.

Figure 1B:
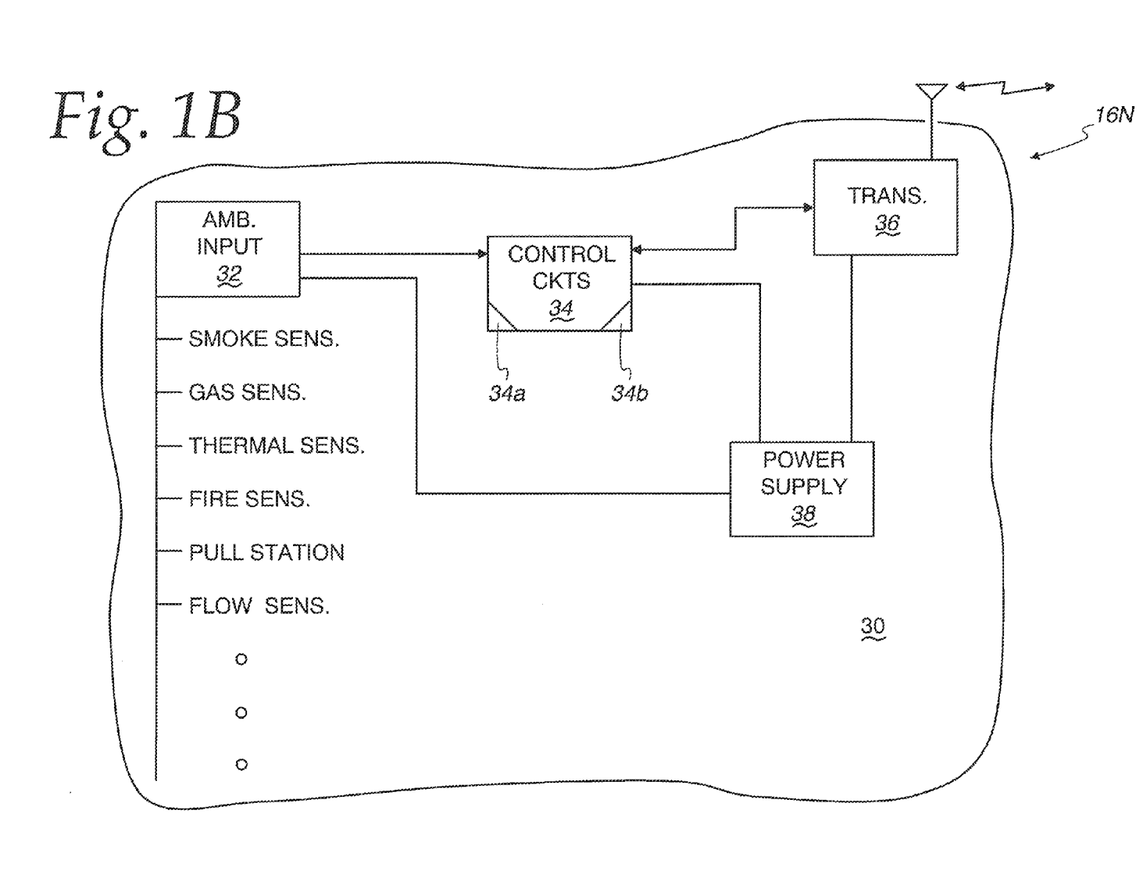
FIG. 1B is a block diagram of input devices usable with the system of FIG. 1A.

FIG. 1B illustrates a representative block diagram of a wireless input device 16i. The device 16i has a housing 30. The housing 30 carries an ambient condition sensor 32 such as a smoke sensor, a gas sensor, a thermal sensor, a fire sensor, a pull station, a flow sensor or the like all without limitation. The device can also implement multiple ambient sensors. The ambient input device 32 couples condition indicating output signals to control circuits 34. The control circuits 34 can be implemented with one or more programmable processors 34a and associated control software 34b which could be recorded on a computer readable medium.

The control circuits 34 are coupled to an RF transceiver 36 and are in bidirectional communication with other modules and/or the control unit 12. A power supply 38, implementable with a battery, or from an external source, or both, energizes the device.

Figure 1C:
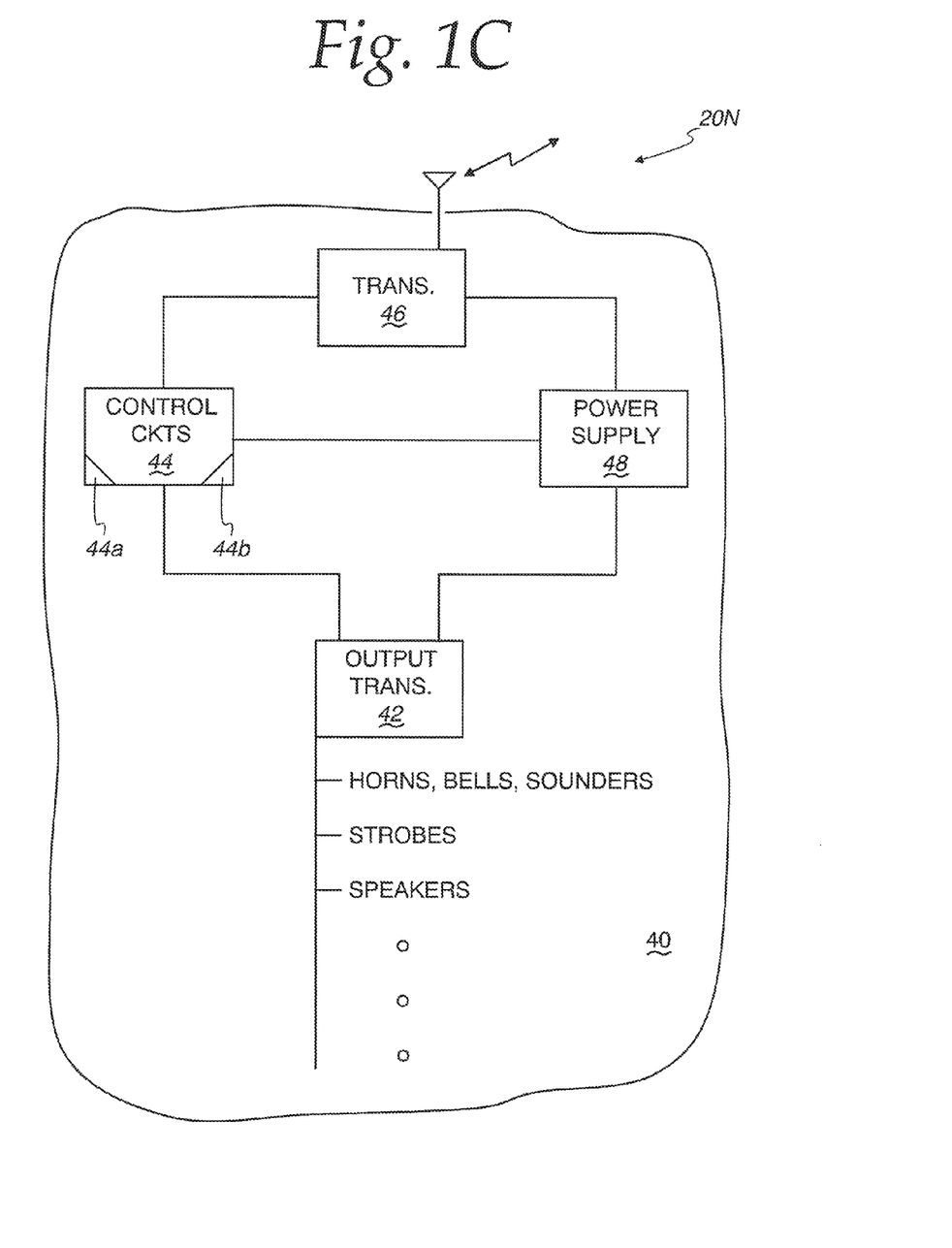
FIG. 1C is a block diagram of output devices usable with the system of FIG. 1A.

FIG. 1C illustrates a representative block diagram of an output device 20i. The device 20i has a housing 40 which carries an output transducer 42. The output transducer 42 could be implemented with a non-verbal audio device such as a horn, bell or sounder. Alternatively, the transducer 42 could be implemented with a strobe, for a visual output, or a speaker to provide for verbal output. An output device may comprise multiple audio-visual indication elements such strobes, speakers, bells, sounders, etc. A hybrid device can have one or more sensors and one or more audio-visual indication elements.

The device 20i can also include control circuits 44 which can energize the output transducer 42 as needed. The control circuits 44 can be implemented with one or more programmable processors 44a and associated control software 44b which could be stored on a computer readable medium.

The device 20i can also include an RF transceiver 46 coupled to control circuits 44. A power supply 48, which might be coupled to a battery, or, an external source of electrical energy, or both, to drive the transducer 42, can also be coupled to the other electronic components of device 20i.

As described herein, the system 10 is configured so that the input devices 16 and output devices 20 communicate with one another and with the control unit 12 in a mesh network configuration in which each such device functions as a node that talks to each other to share the network connection across a large area.

Figure 2:
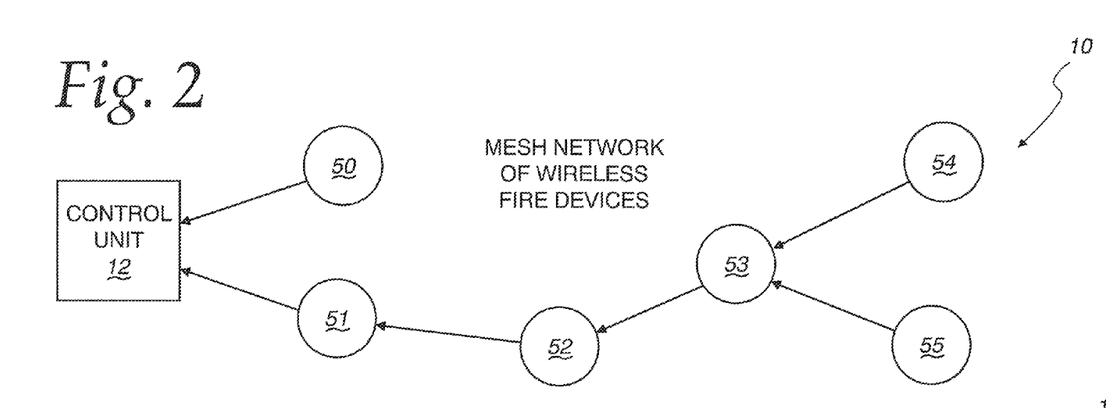
FIG. 2 is a view of the system of FIG. 1A illustrating an exemplary communication link.

FIG. 2 is a view of exemplary communication links for a mesh network of wireless fire devices 50, 51, 52, 53, 54 and 55 in communication with the control unit 12. The fire devices 50-55 could be any of the input devices 16 or output devices 20, discussed above, as well as other such devices. Each is illustrated as a node in the mesh network. As shown, the first device 50 communicates directly with the control unit 12, as does the second device 51. The second device in turn communicates with the third device 52 which in turn communicates with the fourth device 53. The fourth device 53 communicates with both the fifth device 54 and the sixth device 55. As is apparent, with a mesh network, any of the devices 50-55 could communicate with any of the other devices directly and ultimately indirectly to the control unit 12.

In the embodiment of FIG. 2, the control unit 12 includes wireless communication circuitry. If the control unit 12 does not include wireless communications, then the system 10 is modified to include a gateway 56 connecting the control unit 12 to the mesh network of fire devices 50-55, as shown in FIG. 3.

Figure 3:
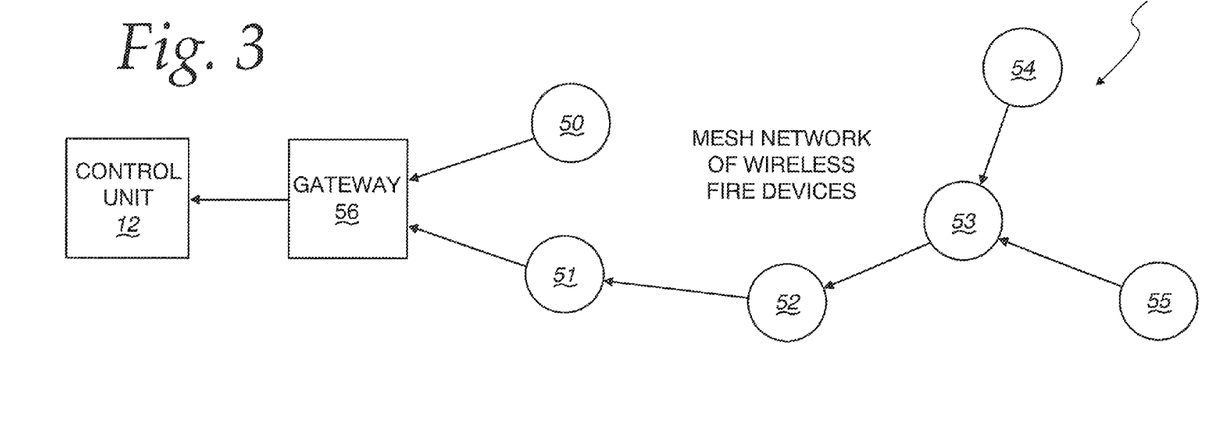
FIG. 3 is a view similar to FIG. 2 illustrating an alternative exemplary communication link.
Figure 4:
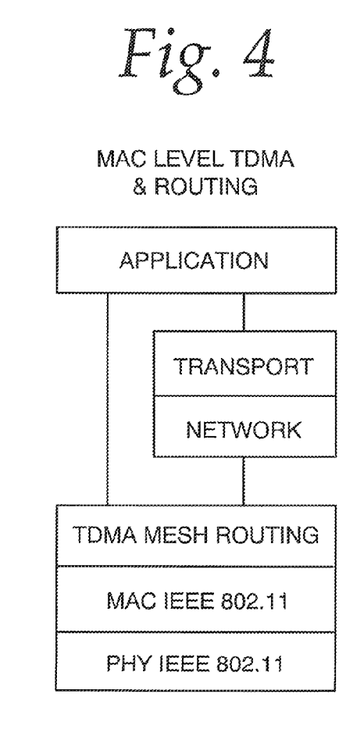
FIG. 4 illustrates a communication stack implementation for MAC layer mesh and time division multiple access (TDMA) protocol.
Figure 5:
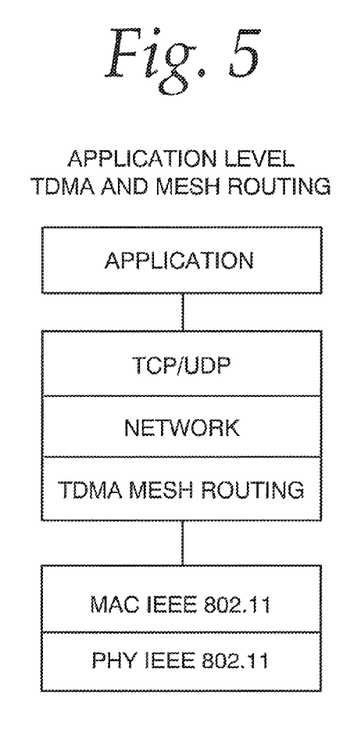
FIG. 5 is a communication stack implementation illustrating network layer mesh and TDMA protocol.
Figure 6:
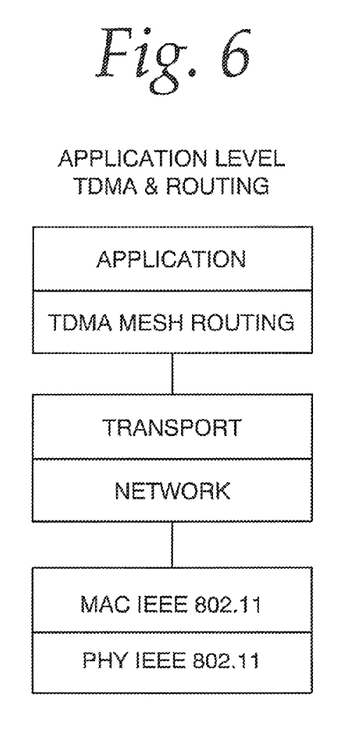
FIG. 6 is a communication stack implementation illustrating application layer mesh and TDMA protocol.

The control unit 12 in each of the input devices 16 and 20, or the gateway 56, see FIG. 3, communicates using an open standard high data rate protocol. FIGS. 4, 5 and 6 illustrate different device communication stack architectures for implementing this protocol. This illustrates the functions of the communication system in terms of abstraction layers in a conventional manner in which similar communication functions are grouped into logical layers. An instance of a layer provides services to its upper layer instances while receiving services from the layer below. Each includes a physical layer which provides basic communication functions. Each includes a data link layer in the form of a media access control (MAC) layer. The remaining layers are dependent on the particular protocol being used, but include an uppermost application layer above a TDMA layer which implements an algorithm for controlling time slot implementation for the TDMA routing.

FIG. 4 illustrates providing timed synchronization implementation at the MAC layer level for mesh routing. Using the mesh routing at a lower stack level provides lower overhead and lower processing delays at the routing nodes.

In implementations where there is no mesh function in the MAC layer, then the IP layers or Network layer of the stack may implement the TDMA and mesh routing as shown in FIG. 5. Finally, networks that do not support TCP routing at IP or Network layer can use any network and implement the TDMA and mesh routing function at the application layer as shown in FIG. 6. Thus, standard or publicly known mesh routing implementation or any upcoming standard based implementation such as 801.11S can be used for mesh routing.

Figure 7:
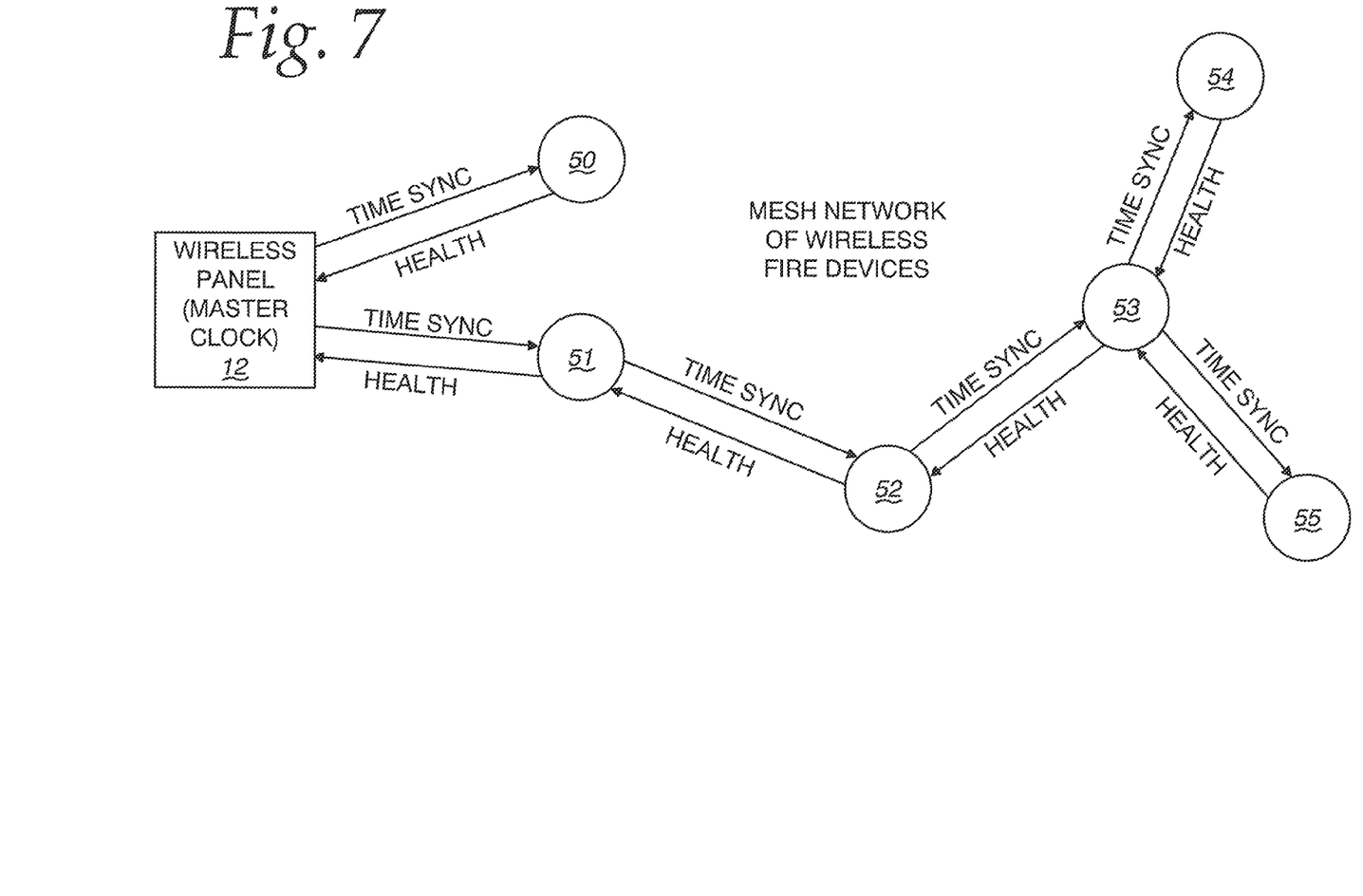
FIG. 7 is a view of the system of FIG. 2 illustrating time sync and health messages.

In the exemplary system, either the gateway 56 or the control unit 12 hosts a master clock to the network. All of the devices 50-55 use accurate and preferably temperature controlled clock sources, such as temperature controlled crystal oscillators, to reduce the amount of clock drift. As shown in FIG. 7, the devices 50-55 exchange periodic health messages in order to synchronize with each other and the master clock source. Accurate synchronization across the network can be achieved using frequent health message exchange so that voice evacuation and audio visual devices can be supported on the network. The clocks of network devices will be synchronized with that of master devices to a desired accuracy using one of the known methods in the art. Any of these methods can be implemented using health messages or a sequence thereof. The nodes are synchronized just after discovery and later at an interval depending on worst case clock drifts.

As illustrated in FIG. 7, each device 50-55 sends a health message over the mesh network so that the messages are ultimately received at the control unit 12. A time sync message originates from the control unit 12 and is communicated over the mesh network to each device 50-55. The failure to receive consecutive time sync messages results in finding an alternate routing node for subsequent communications, as is conventional with mesh networks. The failure to receive consecutive health messages results in declaring a node/link failure. Both of the failures result in network reorganization in order to keep the communication links in tact and robust.

Figure 8:
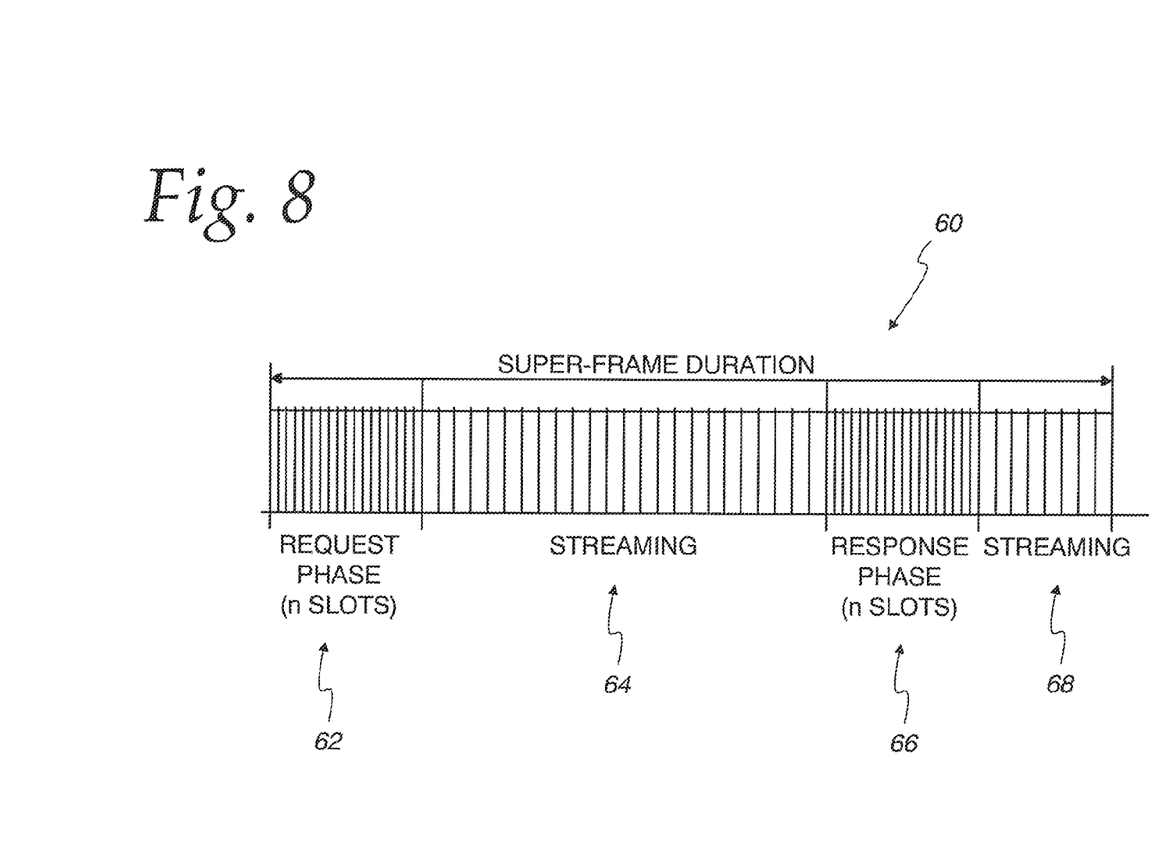
FIG. 8 is a diagram that illustrates an exemplary TDMA communication frame.

FIG. 8 illustrates a communication super frame 60 for implementing the TDMA mesh communication protocols. The super frame 60 includes a request phase 62, a streaming phase 64, a response phase 66 and a streaming phase 68. Each of the request phase 62 and response phase includes "n" slots. The number of slots is dependent on the number of nodes available in a system. The request phase is used for cascading messages from the farthest node in the system 10 to the control unit 12. The response phase is used for cascading messages from the control unit 12 out to the devices 50-55.

The super frame provides support for time critical and high data rate applications. The system 10 uses dedicated cascading time slots for latency sensitive applications such as a fire network using request phases and response phases, as disclosed in the referenced published application. The gap between requests and response phases 62 and 66 comprise streaming phases 64 and 68 which utilize longer time slots for high band width applications. The streaming slots can be route dependent and determined in an ad hoc manner. The slots can also be determined up front based on sourced and end points of streaming communication. For example, the streaming phases 64 and 68 may be used for additional applications which need streaming audio or video. The time critical safety application data is sent in the request phases 62 and response phases 66.

Battery life management is provided by the devices sleeping when they expect no communication from their previous or next level node. Each node always wakes up for cascading slots of latency sensitive applications. The nodes are informed of high band width data streaming before it begins so that they can remain awake during the longer time slots. When streaming ends, the nodes go back to power save mode where they only wake up in cascading slots of latency sensitive applications. The control unit 12 may or may not be part of the high data rate streaming allowing formation of optimal paths to improve network through put needed for the communication.

Discovery is possible by the established network devices simultaneously or zone wise entering in discovery mode where the remaining wait for appropriate time for new nodes to join the network. The discovery mode can be invoked either periodically or by operator instruction.

Figure 9:
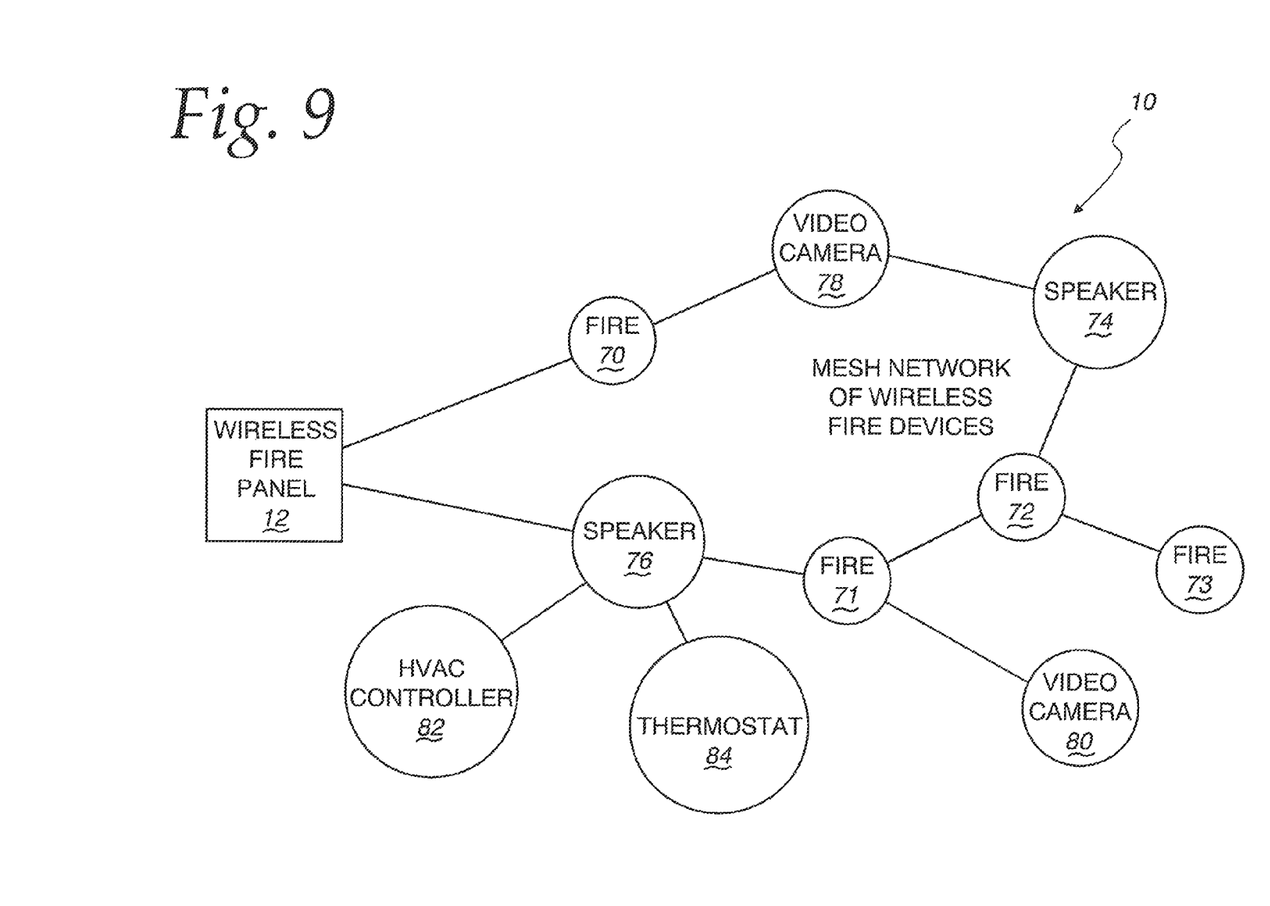
FIG. 9 is a more detailed view of a wireless fire detection monitoring system illustrating exemplary communication links.

FIG. 9 illustrates a more detailed example of communications for an exemplary wireless fire detection monitoring system 10 including streaming type devices. The system includes basic fire detection devices 70-73, as discussed above and speakers 74 and 76. Additional applications are supported such as video cameras 78 and 80, an HVAC controller 82 and a thermostat 84. All of these devices are connected in a mesh network which provides communication paths as desired. Applications such as voice evacuation, video surveillance and HVAC systems are part of the mesh and may take advantage of the streaming phases 64 and 68, see FIG. 8, as noted above.

Thus, as disclosed herein, a fire detection monitoring system uses a TDMA mesh communications protocol over a mesh of open standard high data rate protocol based wireless devices. A TDMA mesh communication provides time synchronization to achieve deterministic performance as well as schedule the communications to reduce power consumption. The use of open standard high data rate protocol based wire devices allows the system to be implemented using mesh communications of standard based radio devices at MAC layer level, network layer level or at an application layer level depending upon the implementation and availability of access to layers of the wireless stack.

Figure 10:
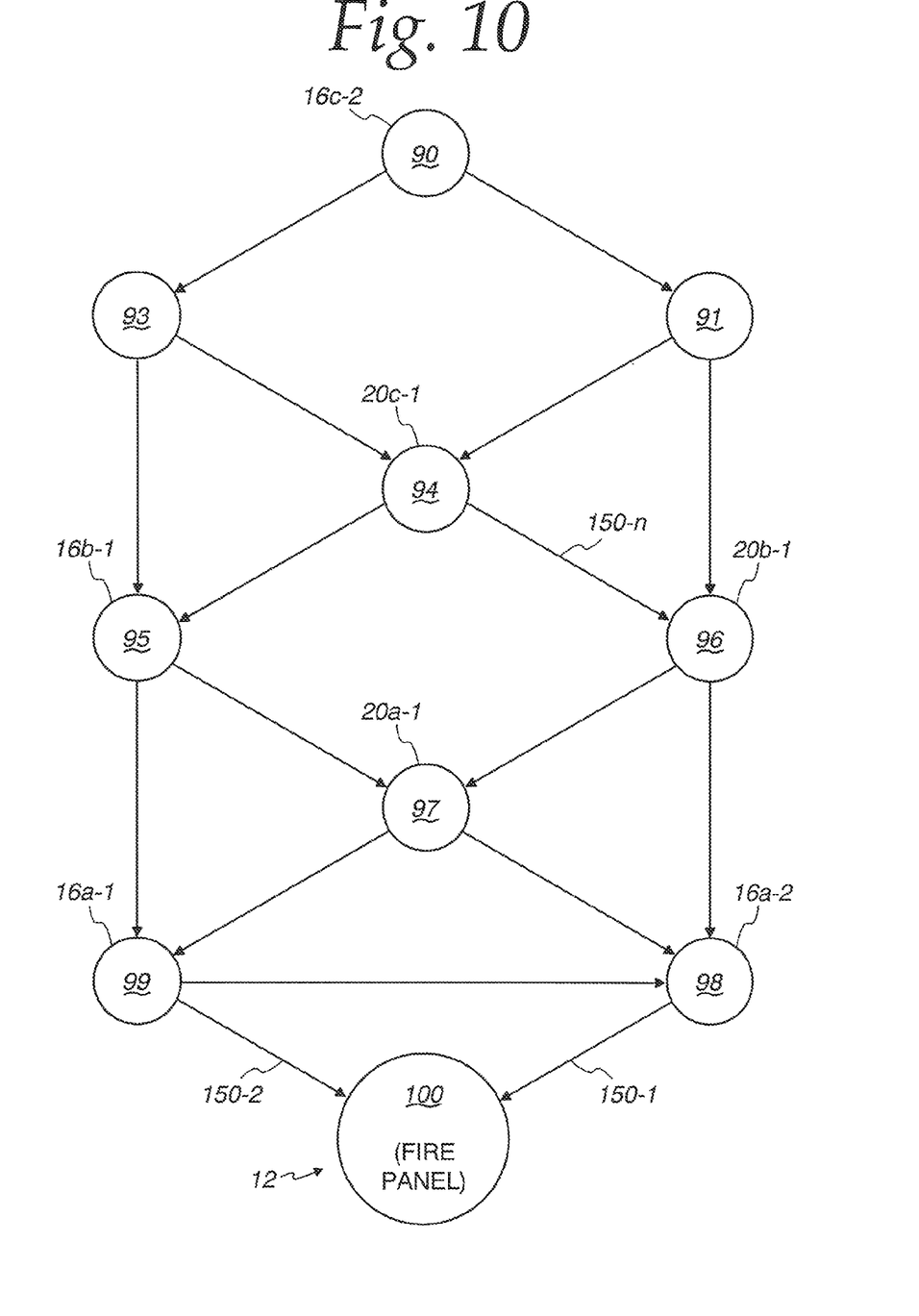
FIG. 10 is a view of the system of FIG. 1 illustrating exemplary communication links.

The wireless environmental monitoring and, or alarm system, disclosed herein incorporates a multi-hop, time division multiple access (TDMA) communications protocol. Each module or device (a node), can have a parent-child relationship with two neighbouring nodes which are in wireless range of the child node. Associating two parent nodes with each child node provides redundancy in communications. This is generally illustrated in FIG. 10, discussed below. Some standards my not allow simultaneous transmission of a packet to two parents. In such case the child packet will be transmitted separately to the two parents. A different mode such as adhoc mode of 802.11 can be used to implement dual connectivity from each device.

The cascading wave communication protocol works on principle of data aggregation. The packet transmitted by a first sensor has only its own data. When packet is received by a second sensor, it appends its data to and transmits it to the third sensor. When the packet reaches the fire control unit, it carries data of all sensors in the sequence.

An exemplary wireless fire system can include, for example, 100 devices. The respective packet size can then be appropriate to aggregate data of all 100 devices. Each time slot is long enough to accommodate a maximum size packet and its acknowledgement. Those of skill will understand that neither the exemplary number of devices, nor packet size, or length of time slots is limitation of the invention.

To enable efficient data aggregation without increasing message latency, the child nodes are allocated Tx slots before the parent nodes. Thus, child node's data is always available at the parent node during parent's Tx slot and parent can aggregate its own data with that received from its child node and transmit the data together in single packet. A node can have multiple child nodes. The Tx slots of all child nodes occur before the parent. A parent's packet contains the data or alarms received from all its child nodes aggregated with its own data.

Due to aggregation, the transmission of 4 nodes' data to the fire panel 12 needs only 4 slots. In case of 100 node network, it takes 100 slots for all nodes' data to reach the panel 12. Using the same protocol, the fire panel 12 can also send data to all 100 nodes in the network which reaches all devices in 100 slots. For communication from fire panel 12 to the devices the slot allocation of the nodes is reversed.

In the disclosed embodiment the total frame time corresponds to an exemplary two second interval. During this time interval, the data can traverse from the furthest level device to the panel 12 and back from the panel 12 to the furthest level device. Thus, exemplary round trip end-to end latency from devices to the panel 12 and back from panel to device will be on the order of 2 seconds. As data traverses at each level, the data is aggregated and the aggregated data is moved to next level.

During the request phase 62, messages traverse from devices such as 16a-1 to the panel 12. Each device is assigned a time slot to send, for example an alarm/data/status message. Each module or device can report its status. Detectors or input devices can report alarm, data and other event messages.

The request phase can be divided into a predetermined number, for example 100, of slots to accommodate each device's Request Tx Slot in the order of 1 to 100. In this phase, each parent node will receive data from its child nodes in the respective child nodes' slots and then aggregate the child nodes' data with its own data and transmit to its parent node in its Request Tx Slot. This can be understood from the example network shown in FIG. 10. In this example, devices having slots 93 and 91 can simultaneously receive data from a child node having slot 90. Each of the devices having slots 93, 91 can then aggregate the child's with its own data and send that composite to its respective parents. The parent device having slot 94 receives data from 93 and 91 and sends to its parents 95 and 96 and so on till it reaches the fire panel 12.

During the response phase 66 messages from the panel 12 arrive at the devices such as 16b-1. Slot allocations in the response phase are mirror images of those in the request phase. In the request phase the panel 12 has the last slot where as in the response phase the panel 12 has the first slot. The fire panel node transmits a Clock Beacon during its Request Tx slot whereas Response Tx slot is used for transmitting panel's data to the devices in the network.

The response phase can be divided into 100 exemplary response phase slots to accommodate each device's Response Tx Slot. The slot allocation in the response phase is the reverse that of the request phase. The panel 12 gets the 1st slot, the nodes close to the panel 12 get lower numbered slots and nodes away from the panel 12 get higher numbered slots. Due to this slot allocation, cascading data flow from the panel 12 towards devices is established. The slot number in the response phase is calculated by subtracting the request phase slot number, which is allocated by GSM. In this phase, each node will receive aggregated data from its parent node in the parent node's Response Tx Slot, process its own data then broadcast the data to its child nodes in its own Response Tx Slot. For example the device having slot 99 will receive aggregated data from its parent node (i.e. the fire panel 12) having slot 100 in the parent's Response Tx Slot, process its own data and then broadcast the data to its child nodes in its own Response Tx Slot. The child nodes 98 and 97 receive this data, process their own data and broadcast to their child nodes and so on till the aggregated packet reaches all the devices of the network.

All slots of the request and response phase preferably, but not necessarily, are of equal duration.

In addition to the on-the-air time of the Long-data packet and ACK, the Request Tx slot duration has a dead time for tolerating the worst case clock drifts of the transmitter and receivers. To avoid missing a packet due to this drift, the receiver node(s) can remain on before the earliest time in the slot when transmitter can begin transmission considering the worst case drift. The transmitter also needs to wait before it begins the transmission so that a worst drifted receiver node can receive its packet. The time needed in the time slot for drift tolerance depends on worst case possible drift in the transmitter and receiver. The slot duration also includes the channel access time as defined in the standard protocol. For example, in 802.11 the channel access time will be a function of interframe spacing, back-off algorithm, and retry algorithms and counts. The slot duration will include a duration resulting from a worst case combination of these parameters.

As discussed above, the slots can be numbered from 1 to 100 with the 100th slot number being allotted to the fire panel node by default, 99th to next deployed device, 98th to the next device and so on. Along with getting a Slot Number, a new device (except the panel 12) joining the network can also be assigned two parent devices for redundant connectivity with which it can communicate directly and are in it's in the radio range. More than two parents can be assigned to each node if more redundancy is desired. The number of parents and number of slots are exemplary only and not a limitation of the invention.

The fire panel 12 can be assigned the highest slot number, for example slot number 100, the next device deployed will have slot number 99 and parent device as 100 (only one parent available). The third device will have slot number 98 and parents would 99 and 100. The fourth device will have slot number 97 and parents could be any 2 of these: 98, 99 or 100 based on signal strength and so on.

The network supports cascading wave communication of one packet of length less than or equal to that of Long data packet during Request phase of every Frame 60. As discussed before, this packet can be used to carry aggregated sensor data/status and alarms to the panel or it can be used for sending separate messages from an input/output device to fire panel. The Request phase Tx slots are used for transmission of slot allocation request messages, which are not aggregated. The device can send any other custom application level message of length less than or equal to Long data packet to the panel. These packets are relayed by network devices to the panel using the cascading wave protocol as discussed before.

While communicating in the response phase, multiple unicast messages can be sent from the parent to reach child node. In this configuration, every node will be allocated multiple Tx and Rx slots the response phase. There will be a receive slot which will be used to receive data from each parent and separate Tx slots will be used to send the unicast data to the corresponding child nodes.

In alternate processing, each parent transmits the panel's packet to all its child nodes as a multicast packet. The Response Tx slot of the parent node is used to transmit the data to child nodes. All child nodes will listen to the parent in this slot. Nodes selectively listen to the other parent having a later slot if the packet reception from the parent node fails.

Either of these options can be implemented based on communication and battery life requirements.

It can be seen that the end to end communication delay i.e. detection to activation delay is function of maximum number of devices in the network. This is because slot size is function of Long data packet size and Long data packet needs to accommodate data from all devices in the network. The detection to activation delay is defined by regulatory bodies which can be very stringent in some countries. The network can be made adaptive to the end-to-end delay in such a way that it adapts to the requirement by automatically defining the network size for given end-to-end delay.

In this case, the panel node is either informed of total maximum size of network (capacity) or of maximum permissible end to end delay over the network. In the former case, the operator has to manually calculate the capacity and feed to the panel using user interface. In the later case the panel determines Frame duration, slot size & number of slots that can be accommodated in request and response phase from the end-to-end latency requirement. The capacity of network which is equal to the number of Request and Response phase slots, is calculated in following manner:

a) Frame size=permissible end-to-end delay, b) Request phase duration=Response phase duration=½× (Frame size-silence phase duration).

Here the Silence phase duration is constant for given panel implementation.

c) Number of slots=capacity=Request phase duration/ (maximum Packet size+slot overheads);

Here slot overheads include all time components of the Tx slot (such as drift compensation time, ACK reception time, etc.) other that Packet transmission time. The slot overheads are constant for a given implementation.

d) maximum Packet size=(capacity.times.per node payload size)+headers+footers.

Here header and footer sizes are constant.

The capacity is obtained by simultaneously solving equations in step c and step d.

The slot duration is adjusted for timer tick resolution so that all nodes can be synchronized for operation based on the slot duration.

The network nodes need to be aware of the network capacity so as to use appropriate slot sizes and request-response phase durations. The network capacity is configured into all nodes before commissioning. The capacity is stored in all nodes' non-volatile memory for use during normal operation. All nodes of capacity adaptive network have ability to calculate slot size, request-response phase durations and super-frame durations from given capacity.

Operation of the adaptive capacity network is similar to the basic network except that panel 12 maintains the network size within limits. When the network reaches the capacity limit, the panel informs the network nodes to respond to new nodes with a Capacity Full message. This message informs new nodes not to try to join the network. The user can also be informed about the error by using a predefined LED blinking sequence on the new device and on the fire panel user interface if available. Thus the new nodes are blocked from entering the network after the estimated capacity is reached.

In another embodiment, the capacity of the network can be dynamically adapted to the number of devices of the network to give the best possible end-to-end delay performance. When number of nodes in a given network is less than configured capacity, the panel can optimize network performance by configuring network capacity close to the actual number of nodes. If a network of capacity n has n-10 nodes, the panel will configure the network as an n-10 capacity network. By configuring the network to work at present capacity, length of these implicitly addressed fields is reduced and hence that of the packet. The reduced packet size reduces the power consumption of the node thereby improving battery life.

The reduced packet size leads to reduced slot size & reduced Frame duration. The end-to-end latency, which is equal to Frame duration, also gets optimized for present number of nodes. The latency of such adaptive capacity network is better than full capacity network.

The panel coordinates this dynamic capacity adaptation process. It always keeps track of number of currently associated nodes & selects the next higher capacity step than present number of nodes in the network. The capacity steps are predefined in order to have practically possible slot and Frame durations. For example, a network may use capacity steps in multiples of 5. When the network contains 7 nodes, it will be adapted to have capacity of 10. When number of nodes in the network reaches 10 the capacity will be dynamically changed to 15.

When the panel 12 dynamically changes the capacity, it informs all established nodes of the network about the new capacity by sending a broadcast 'capacity change' command message during the response phase. This message also carries the effective super-frame number. All nodes of established network calculate the slot & Frame durations corresponding to the new capacity and start using them from indicated Frame.

To help newly joining nodes understand the current network capacity, the time sync field of health or other messages which is used for time synchronization includes a field indicating present network capacity. The new node configures the slot size and Frame duration accordingly and completes the remaining association steps while maintaining synchronization with the network.

At the end of the commissioning phase, which is indicated using the user interface or otherwise, the panel 12 checks the number of nodes for adapting the network for current size for the first time. From this instant the capacity is dynamically changed to next higher or lower level after every addition and removal of node(s) based on resulting number of nodes in the network.

Operation of dynamic adaptive capacity network is similar to basic network described above except that panel adapts the capacity according to present number of nodes in the network and also maintains the network size within limits.

All nodes in the network change the capacity as instructed by the panel using 'Capacity Change' command at the beginning of indicated Frame.

When the network reaches the capacity limit, the panel 12 informs the network nodes to respond to new nodes with a 'Capacity Full' message. This message informs new nodes not to try to join the network. The user is also informed about the error by using a predefined LED blinking sequence on the new device and on the fire panel user interface, if available. Thus the new nodes are blocked from entering the network.

Those of skill will understand that the present wireless network can include or be part of a wired monitoring system without departing from the spirit and scope of the invention. Similarly, neither the number or type of input devices, nor the number or types of output devices are limitations of the invention.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims. Though this invention is explained with reference to a fire system, it can be used for any application having similar communication requirements.

The invention claimed is:

1. A wireless fire detection monitoring system comprising:
   a control unit which includes a wireless transceiver and control software to implement a wireless multi-hop communications protocol; and
   a plurality of battery powered monitoring devices where each device includes software to implement the wireless communication protocol with one of: the control unit and at least one other child member of the plurality; or at least two other members of the plurality where a selected device communicates with at least one child device and at least one parent device,
   wherein the wireless multi-hop communications protocol comprises time division multiple access (TDMA) communications with the monitoring devices being time synchronized and the control unit and the monitoring devices are adapted to communicate compliant with the IEEE 802.11 standard, the wireless multi-hop communication protocol using a communication system partitioned into abstraction layers comprising an uppermost application layer above a TDMA mesh routing layer which implements an algorithm for controlling time slot implementation for TDMA mesh routing, wherein the TDMA mesh routing layer performs TDMA mesh routing for the plurality of devices, the TDMA mesh routing layer being above a media access control (MAC) layer implementing the 802.11 communications.

2. The wireless fire detection monitoring system of claim 1 where each child device includes software that implements the protocol with one of, two parent devices, or, one parent device and the control unit.

3. The wireless fire detection monitoring system of claim 2 where the child devices include software to transmit messages, on a time slot basis, before the respective parent's transmission time slot.

4. The wireless fire detection monitoring system of claim 2 where the devices include software to transmit messages, on a time slot basis, to at least two parent devices and where if one parent fails, transmission continues with the other parent and where a replacement parent is sought if the one parent fails.

5. The wireless fire detection monitoring system of claim 2 wherein information from different child devices is aggregated and transmitted to respective parent devices.

6. The wireless fire detection monitoring system of claim 2 wherein commands from respective parent devices are received, separated and sent to respective child devices.

7. The wireless fire detection monitoring system of claim 1 wherein the communication protocol is implemented at a MAC level above the MAC layer of the monitoring devices.

8. The wireless fire detection monitoring system of claim 1 wherein the communication protocol is implemented at a network layer of the monitoring devices.

9. The wireless fire detection monitoring system of claim 1 wherein the communication protocol is implemented at an application level below the application layer of the monitoring devices.

10. The wireless fire detection monitoring system of claim 1 wherein the devices include software to transmit responses, on a time slot basis to at least two parent devices.

11. The wireless fire detection monitoring system of claim 7 which includes circuitry to adjust at least one of time slot duration or packet size.

12. The wireless fire detection monitoring system of claim 11 wherein members of the plurality include circuitry that receives and rebroadcasts the frames to other members of the plurality.

13. The wireless fire detection monitoring system of claim 12 wherein at least some of the frames include a request section directed to members of the plurality, at least some members of the plurality include second circuitry responsive to a detector specific request in the request section.

14. The wireless fire detection monitoring system of claim 13 wherein alarm/status information from different child detectors is aggregated and sent to respective parents.

15. The wireless fire detection monitoring system of claim 14 wherein commands from respective parent devices are received, split and sent to respective child devices.

16. The wireless fire detection monitoring system of claim 1 wherein at least some of the devices become active for a predetermined time interval during selected time slots to receive incoming data, and in the absence thereof, return to an inactive state.

17. A wireless fire detection monitoring system as in claim 1 wherein the monitoring devices become active for a predetermined time interval during selected time slots to receive incoming data, and in the absence thereof, return to a low power state.

18. A wireless fire detection monitoring method comprising:
   providing a control unit which includes a wireless transceiver and control software to implement a wireless multi-hop communications protocol; and
   providing a plurality of battery powered monitoring devices where each device includes software to implement the wireless communication protocol with one of: the control unit and at least one other child member of the plurality; or at least two other members of the plurality where a selected device communicates with at least one child device and at least one parent device,
   wherein the wireless multi-hop communications protocol implements time division multiple access communications with the monitoring devices being time synchronized and the control unit and the monitoring devices are adapted to communicate compliant with the IEEE 802.11 standard, the wireless multi-hop communication protocol using a communication system partitioned into abstraction layers comprising an uppermost application layer above a TDMA mesh routing layer which implements an algorithm for controlling time slot implementation for TDMA routing, wherein the TDMA mesh routing layer performs TDMA mesh routing for the plurality of devices, the TDMA mesh routing layer being above a media access control (MAC) layer implementing the 802.11 communications.

19. The wireless fire detection monitoring method of claim 18 wherein the child devices transmit messages, on a time slot basis, before the respective parent's transmission time slot.

20. The wireless fire detection monitoring method of claim 18 wherein the devices transmit messages on a time slot basis to at least two parent devices and where if one parent fails, transmission continues with the other parent and where a replacement parent is also sought.

21. The wireless fire detection monitoring method of claim 18 wherein information from different child devices is aggregated and transmitted to respective parent devices.

* * * * *